March 22, 1932.  L. C. HUFF  1,850,933
APPARATUS FOR LINING RECEPTACLES
Filed July 15, 1926  2 Sheets-Sheet 1

Witness:
Stephen F. Rebora

Inventor:
Lyman C. Huff,
by Frank L. Belknap
Atty.

March 22, 1932.  L. C. HUFF  1,850,933
APPARATUS FOR LINING RECEPTACLES
Filed July 15, 1926   2 Sheets-Sheet 2

Witness:
Stephen F. Rebora

Inventor:
Lyman C. Huff
by Frank L. Belknap
Atty.

Patented Mar. 22, 1932

1,850,933

UNITED STATES PATENT OFFICE

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR LINING RECEPTACLES

Application filed July 15, 1926. Serial No. 122,562.

This invention relates to improvements in apparatus for lining receptacles, and refers more particularly to means for so lining the interior of such receptacles which are subjected to corrosive action, the object being that the lining of the present invention will protect the interior walls of the vessel from such corrosion.

In the art of cracking petroleum oil, considerable difficulty has been experienced in the corrosion of parts of the apparatus which is subjected to the action of the hot oil under pressure. This corrosive action tends to wear away parts of the apparatus, thus weakening it, and so reducing its ability to stand pressure as to in time make it dangerous to operate. This corrosion arises from the treatment of oils containing sulphur compounds and the like, which corrode the steel.

In accordance with the present invention, I provide a very simple and effective lining which can readily be applied to the interior of a receptacle, as for example, one of the well known types of expansion chambers now in use in cracking plants, in such a way as to prevent the oil from seeping between the contacting surfaces of the lining and the inner wall of the expansion chamber.

The manner in which this is done, will more clearly appear from the following description, reference being had to the accompanying drawings in which Fig. 1 is a longitudinal vertical section through the side wall of such an expansion chamber.

Figure 1:
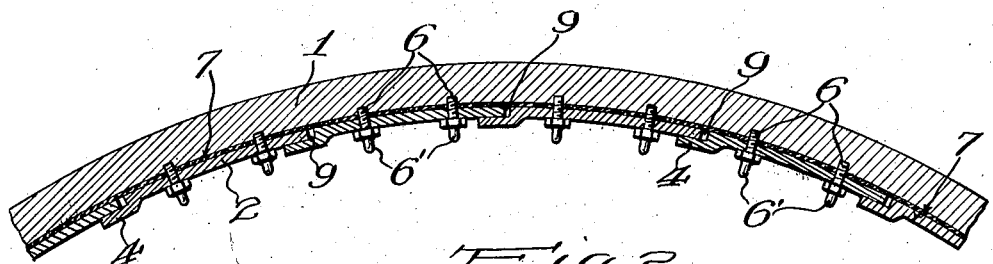
Figure 2:
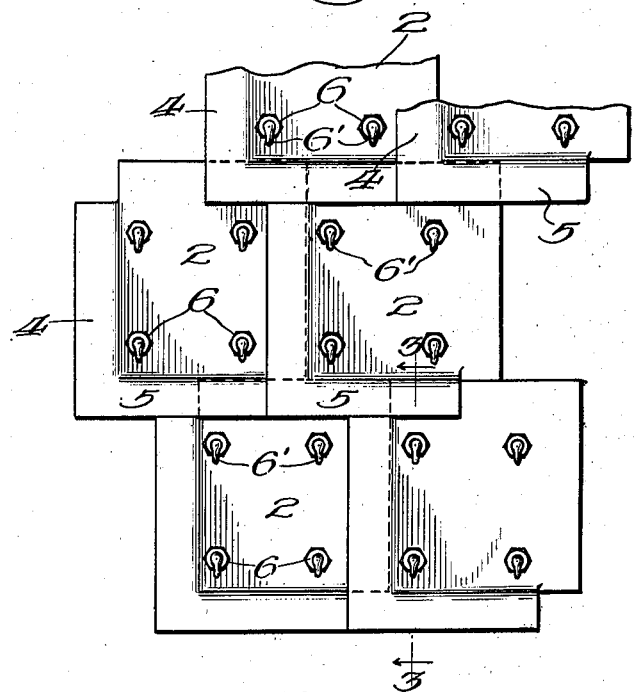
Fig. 2 is a front view of the same.
Figure 3:
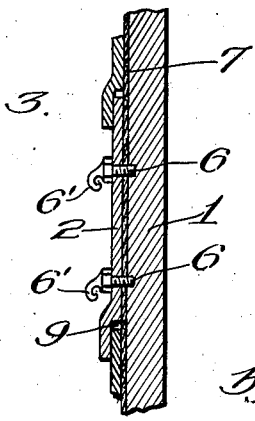
Fig. 3 is a fragmentary sectional elevation of the lining.
Figure 4:
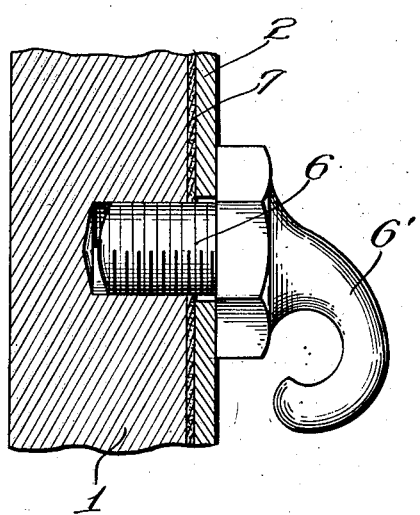
Fig. 4 is a detail showing the manner of securing the lining to the inner wall of the expansion chamber, in the particular instance, a hook and bolt being used, to which the cleaning chain may be attached.
Figure 5:
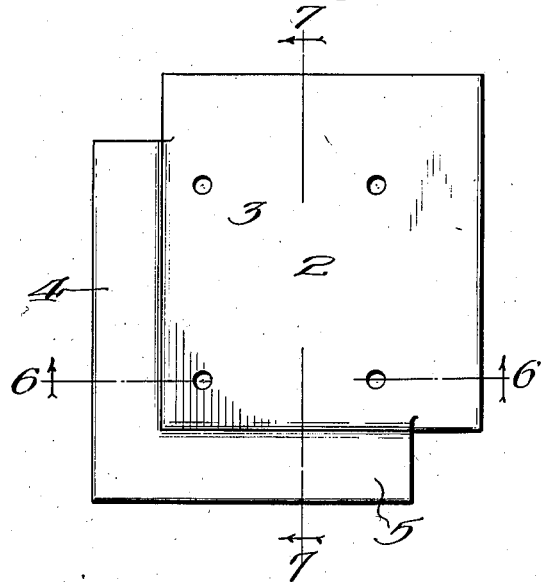
Figure 6:
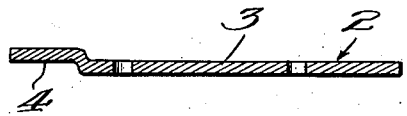
Figure 7:
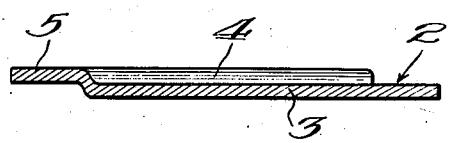

Fig. 5 is a plan of one of the plates used, and Figs. 6 and 7 are details taken on lines 6—6 and 7—7 of Fig. 5.

Referring to the drawings, 1 designates the cylinder wall of an expansion chamber, which expansion chamber is preferably formed of steel of such a character as to be able to withstand high pressures at high temperatures, such as used in cracking plants.

Within the inner wall of this vessel, including not only the side walls but also the top and bottom, I place a straight lining, which lining covers the entire interior exposed surface of the expansion chamber or other receptacle being lined. This lining consists of a plurality of flat plates 2, the construction of which is shown more clearly in Figs. 5 to 7. Each of these plates, consists of a body portion 3 provided at two adjacent sides with raised flange portions 4 and 5 respectively, the arrangement being such that the raised flange edges 4 and 5 are adapted to overlap the body portions of two adjacent plates. These plates forming the sections of the lining have their overlapping edges placed in such a way that the liquid running down the surface of the plates will be deflected from one plate to the other without having an opportunity to get into the joints. The plates are put on in shingle fashion, that is, one overlapping the other, both in vertical and horizontal direction. The plates are secured to the inner walls of the vessel by means of suitable bolts 6. Certain of these bolts may take the form of hooks to receive the chain used in certain of these expansion chambers for cleaning out the carbon, which hooks are shown at 6'. Between the sections or plates forming the lining and the inner wall of the receptacle, is preferably inserted a coating or layer 7 of asbestos, fibre, graphite or the like, which is applied over the inner wall of the vessel before the lining is put in place. This plastic material serves to fill up the uneven spaces and prevent the liquid from entering between the plates and attacking the wall of the chamber. The plates are so applied that the upper horizontal edge and one vertical side fit under the raised flanges of the plate just above and just adjacent. Preferably there is a slight clearance at the overlapping joint as indicated in the drawings, to allow for expansion and contraction, as shown at 9. The plates may be made of any suitable material that will be highly resistant to the corrosive action of oil vapors or liquids that are being treated in the vessel. This lining for example, may be made of aluminum or chromium steel, both of which are very resistant to the action of sulphur compounds, or the lining may be made of whatever material has been found satisfactory to withstand corrosion.

It will be noted that the arrangement is such that the lining can be applied without the necessity of welding, and can be applied to vessels in use in the field, as well as at the factory. It is to be noted that the arrangement is such that all the adjoining plates have their edges overlapping. The plates should preferably be of such size that they can be passed through the manhole of the vessel, and also so arranged and placed as to allow for the expansion and contraction of the individual plates.

I claim as my invention:

1. In an apparatus for cracking hydrocarbon oil, the combination with a metallic vessel having a removable lining, said lining taking the form of a plurality of overlapping pieces of plate, each of said pieces being perforated, and securing means passing through said perforations and penetrating only partly through the wall of the vessel.

2. In an apparatus for cracking hydrocarbon oil, the combination with a metallic vessel having a removable lining, said lining taking the form of a plurality of overlapping pieces of plate, each of said pieces being perforated, and securing means passing through said perforations and penetrating only partly through the wall of the vessel, said perforations and securing means being spaced clear of the overlapping portions of the plates.

3. In an apparatus for cracking hydrocarbon oil, the combination with a metallic vessel having a removable lining, said lining taking the form of a plurality of overlapping pieces of plate, each of said pieces being perforated, and securing means passing through said perforations and penetrating only partly through the wall of the vessel, said perforations and securing means being spaced clear of the overlapping portions of the plates, some of said securing means comprising stud bolts having hook heads adapted to support carbon disrupting means suspended within said vessel.

LYMAN C. HUFF.